United States Patent
Lin et al.

(10) Patent No.: US 10,211,994 B2
(45) Date of Patent: Feb. 19, 2019

(54) POWER SUPPLY SYSTEM, POWER SOURCING EQUIPMENT, AND ETHERNET Y CABLE

(71) Applicant: Sercomm Corporation, Taipei (TW)

(72) Inventors: Chun-En Lin, Taipei (TW); Kuo-Fu Weng, Taipei (TW); Meng-Chien Chiang, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 0 days.

(21) Appl. No.: 15/959,518

(22) Filed: Apr. 23, 2018

(65) Prior Publication Data

US 2018/0241579 A1  Aug. 23, 2018

Related U.S. Application Data

(62) Division of application No. 14/931,894, filed on Nov. 4, 2015, now Pat. No. 9,973,343.

(60) Provisional application No. 62/189,260, filed on Jul. 7, 2015.

(30) Foreign Application Priority Data

Apr. 9, 2015  (CN) .......................... 2015 1 0166079
Aug. 11, 2015  (CN) .......................... 2015 1 0489557

(51) Int. Cl.
*H04L 12/10*  (2006.01)
(52) U.S. Cl.
CPC .................................... *H04L 12/10* (2013.01)

(58) Field of Classification Search
None
See application file for complete search history.

(56) References Cited

U.S. PATENT DOCUMENTS

| | | | |
|---|---|---|---|
| 7,696,765 B2 | 4/2010 | Yu | |
| 8,155,012 B2 | 4/2012 | Austermann, III et al. | |
| 8,804,538 B1 | 8/2014 | Higgins et al. | |
| 8,902,760 B2 | 12/2014 | Austermann, III et al. | |
| 8,942,107 B2 | 1/2015 | Austermann, III et al. | |
| 9,019,838 B2 | 4/2015 | Austermann, III et al. | |
| 2006/0112288 A1* | 5/2006 | Schindler ................ G06F 1/266 | |
| | | | 713/300 |
| 2006/0164062 A1 | 7/2006 | Stineman, Jr. et al. | |
| 2009/0045818 A1 | 2/2009 | Male | |
| 2009/0280739 A1 | 11/2009 | Saar et al. | |
| 2010/0182024 A1 | 7/2010 | Yu | |
| 2012/0104860 A1* | 5/2012 | Feng ........................ H02J 1/10 | |
| | | | 307/80 |

(Continued)

FOREIGN PATENT DOCUMENTS

| | | |
|---|---|---|
| CN | 101112042 A | 1/2008 |
| CN | 101931538 A | 12/2010 |
| CN | 202818107 U | 3/2013 |

*Primary Examiner* — Cassandra Cox
(74) *Attorney, Agent, or Firm* — McClure, Qualey & Rodack, LLP

(57) ABSTRACT

A power sourcing equipment is provided. The power sourcing equipment is connected to an Ethernet cable. The power sourcing equipment includes a switching circuit, a power circuit, and a detection circuit. The power circuit is coupled to a power supply output terminal via the switching circuit. The detection circuit is configured to control a state of the switching circuit according to a first resistance between a first pin and a second pin of the Ethernet cable.

11 Claims, 7 Drawing Sheets

(56) References Cited

U.S. PATENT DOCUMENTS

| | | | | |
|---|---|---|---|---|
| 2014/0129850 A1* | 5/2014 | Paul | .................. | H04L 12/10 |
| | | | | 713/300 |
| 2015/0091391 A1* | 4/2015 | Dwelley | ................ | H04L 12/10 |
| | | | | 307/130 |
| 2015/0293572 A1* | 10/2015 | Zhuang | ................... | G06F 1/266 |
| | | | | 713/300 |

* cited by examiner

POWER SUPPLY SYSTEM, POWER SOURCING EQUIPMENT, AND ETHERNET Y CABLE

This application is a divisional application of U.S. patent application Ser. No. 14/931,894, filed Nov. 4, 2015, now U.S. Pat. No. 9,973,343, which claims the benefits of People's Republic of China application Serial No. 201510166079.X, filed Apr. 9, 2015, U.S. provisional application Ser. No. 62/189,260, filed Jul. 7, 2015 and People's Republic of China application Serial No. 201510489557.0, filed Aug. 11, 2015, the subject matters of which are incorporated herein by reference.

BACKGROUND

Field of the Invention

The disclosure relates in general to a power sourcing equipment and a power supply system, and more particularly to a power sourcing equipment and a power supply system where power is supplied via an Ethernet cable.

Related Art

Electronic devices need power to function properly, and so do the network devices. Assume that a local network device, such as an Ethernet switch, is connected to three remote network devices, such as wireless network base stations, four power supplies are required to make this local area network work. However, it may be difficult for network devices to be plugged into a mains socket if the network devices are located outdoors, on the roof, or on an enclosing wall of the house.

In the circumstances mentioned above, it may be better to supply power to a network device through an Ethernet cable.

SUMMARY

The disclosure is directed to a power supply system, a power sourcing equipment (PSE), and an Ethernet Y cable. One of the advantages of the power supply system is that the PSE automatically detects a powered device (PD) to determine whether or not power is supplied to the PD.

According to one embodiment of the invention, a power sourcing equipment is provided. The power sourcing equipment is connected to an Ethernet cable. The power sourcing equipment includes a switching circuit, a power circuit, and a detection circuit. The power circuit is coupled to a power supply output terminal via the switching circuit. The detection circuit is configured to control a state of the switching circuit according to a first resistance between a first pin and a second pin of the Ethernet cable.

According to one embodiment of the invention, a power supply system is provided. The power supply system includes an Ethernet cable, a power sourcing equipment, and a powered device. The power sourcing equipment includes a switching circuit, a power circuit, and a detection circuit. The power circuit is coupled to a power supply output terminal via the switching circuit. The detection circuit is configured to control a state of the switching circuit according to a first resistance between a first pin and a second pin of the Ethernet cable. The powered device is connected to the power sourcing equipment via the Ethernet cable. The powered device makes the first pin of the Ethernet cable connected to the second pin of the Ethernet cable.

According to one embodiment of the invention, a power supply system is provided. The power supply system includes an Ethernet cable, a power sourcing equipment, and a powered device. The power sourcing equipment includes a switching circuit, a power circuit, and a detection circuit. The power circuit is coupled to a power supply output terminal via the switching circuit. The detection circuit is configured to control a state of the switching circuit according to a first resistance between a first pin and a second pin of the Ethernet cable. The powered device is connected to the power sourcing equipment via the Ethernet cable. The powered device makes the first pin of the Ethernet cable connected to the second pin of the Ethernet cable. The powered device includes an internal resistor, which is disposed between the third pin and the fourth pin of the Ethernet cable.

According to one embodiment of the invention, an Ethernet Y cable is provided. The Ethernet Y cable has a first terminal, a second terminal, and a third terminal. Each of the first, second, and third terminals includes a first pin, a second pin, a third pin, and a fourth pin. The Ethernet Y cable includes a first capacitor, a second capacitor, a third capacitor, a fourth capacitor, and a first inductor. The first capacitor connects the first pin of the first terminal to the first pin of the third terminal. The second capacitor connects the second pin of the first terminal to the second pin of the third terminal. The third capacitor connects the third pin of the first terminal to the third pin of the third terminal. The fourth capacitor connects the fourth pin of the first terminal to the fourth pin of the third terminal and the third pin of the second terminal. The first inductor connects the first pin of the second terminal to the first pin of the third terminal. The second pin of the second terminal is connected to the fourth pin of the second terminal.

According to one embodiment of the invention, an Ethernet Y cable is provided. The Ethernet Y cable has a first terminal, a second terminal, and a third terminal. Each of the first, second, and third terminals includes a first pin, a second pin, a third pin, and a fourth pin. The third terminal further includes a fifth pin and a sixth pin. The Ethernet Y cable includes a first capacitor, a second capacitor, a third capacitor, a fourth capacitor, and a first inductor. The first capacitor connects the first pin of the first terminal to the first pin of the third terminal. The second capacitor connects the second pin of the first terminal to the second pin of the third terminal. The third capacitor connects the third pin of the first terminal to the third pin of the third terminal. The fourth capacitor connects the fourth pin of the first terminal to the fourth pin of the third terminal and the third pin of the second terminal. The first inductor connects the first pin of the second terminal to the first pin of the third terminal. The second pin of the second terminal is connected to the fifth pin of the third terminal, and the fourth pin of the second terminal is connected to the sixth pin of the third terminal.

The invention will become apparent from the following detailed description of the preferred but non-limiting embodiments. The following description is made with reference to the accompanying drawings.

Figure 1:
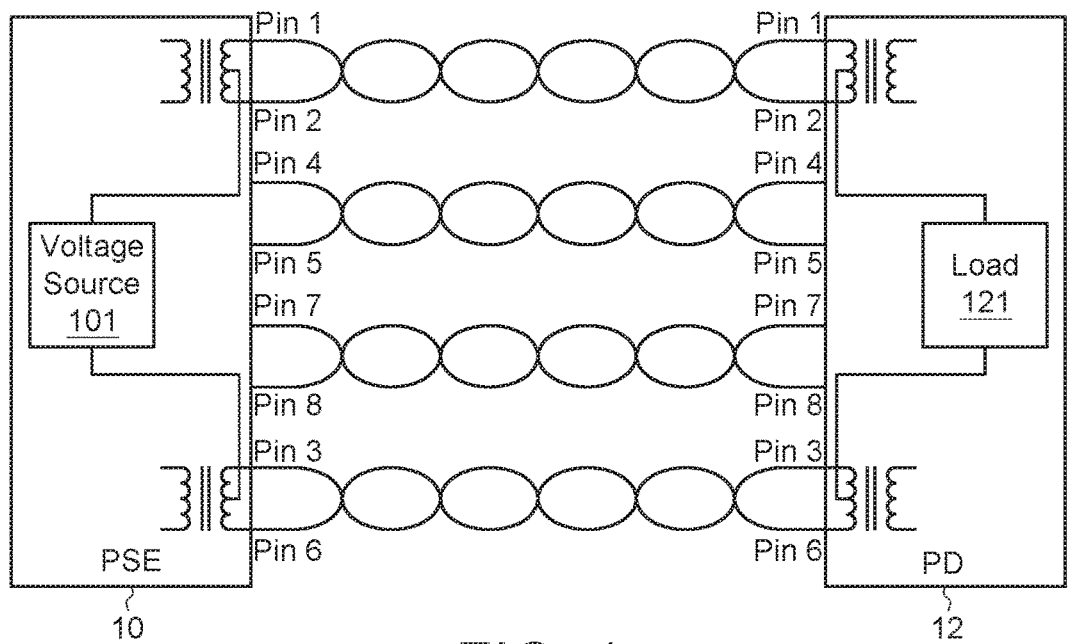
FIG. 1 shows a diagram illustrating a power over Ethernet (PoE) system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a diagram illustrating a PoE system. The PSE 10 is connected to the PD 12 via an Ethernet cable. For example, the PSE 10 may be a network switch, a WiFi adapter, or similar equipment capable of supplying power. The PD 12 may be a network device, such as an Internet Protocol (IP) telephone, a wireless access point (AP), or an IP camera. The PSE 10 supplies power and transmits data to the PD 12 via the Ethernet cable. The PD 12 may also transmit data to the PSE 10 via the Ethernet cable.

The Ethernet cable may be a category 5 cable (CAT-5), a category 5 enhanced cable (CAT-5e), or CAT-6. The Ethernet cable includes four twisted pairs with 8 pins. Each twisted pair transmits a differential signal. The Ethernet cable is illustrated as four twisted pairs in FIG. 1. As shown in FIG. 1, pin 1 is paired with pin 2 to transmit data with differential signal (TX+, TX−), and pin 3 is paired with pin 6 to receive data with differential signal (RX+, RX−). The other two twisted pairs are pin 4 paired with pin 5, and pin 7 paired with pin 8.

The PSE 10 includes a voltage source 101, which may provide a DC voltage generated by voltage transformation and regulation of an AC voltage source from supply mains. The data input/output terminal of the PSE 10 includes a differential signal pair of pin 1 and pin 2 and another differential signal pair of pin 3 and pin 6. The differential signal is generated by a center-tapped transformer. The voltage output of the voltage source 101 is coupled to the center tap of the transformer as a common mode signal. The PD 12 has corresponding connection points, pins 1, 2, 3, 6 of the Ethernet cable, where center-tapped transformers are disposed as well. Therefore power may be supplied to an internal load 121 of the PD 12. As such, pins 1, 2, 3, 6 of the Ethernet cable are responsible for not only transmitting data but also supplying power to the PD 12.

If the PSE 10 unconditionally supplies power to a random device connected via Ethernet to the PSE 10, there may be potential damage to the connected device. In order to prevent such situation, the PSE 10 may be appropriately designed to identify whether or not the connected device is compatible (suitable for being supplied power). For example, the PSE 10 (such as a wireless adapter) may be designed to supply power to a specific IP camera. When a laptop computer is connected to the PSE 10 via a Ethernet cable, there may be data transmission on the Ethernet cable. However, the PSE 10 will not supply power to the laptop computer. Similarly, the PD 12 may also be appropriately designed such that the PD 12 can be successfully identified as a compatible powered device when being connected to the PSE 10.

Figure 2:
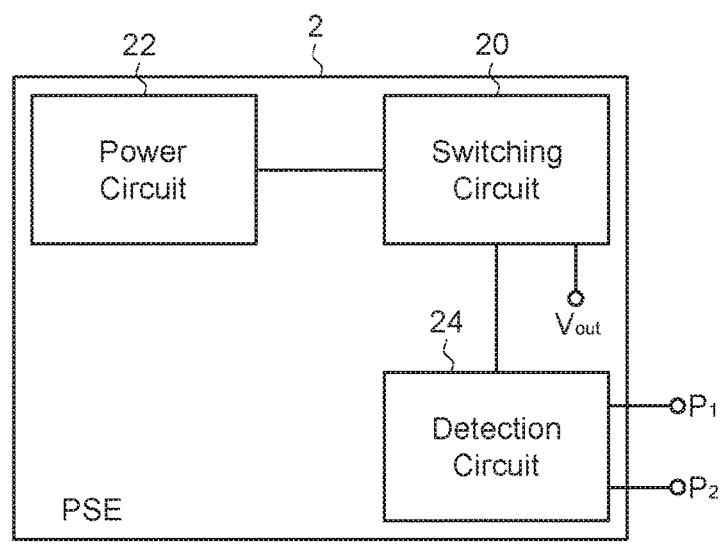
FIG. 2 shows a diagram of a power sourcing equipment according to one embodiment of the invention.

FIG. 2 shows a diagram of a power sourcing equipment according to one embodiment of the invention. The PSE 2 is connected to an Ethernet cable. The PSE 2 includes a switching circuit 20, a power circuit 22, and a detection circuit 24. The power circuit 22 is coupled to a power supply output terminal $V_{out}$ via the switching circuit 20. The detection circuit 24 is configured to control a state of the switching circuit 20 according to a first resistance $R_v$ between a first pin $P_1$ and a second pin $P_2$ of the Ethernet cable.

Figure 3:
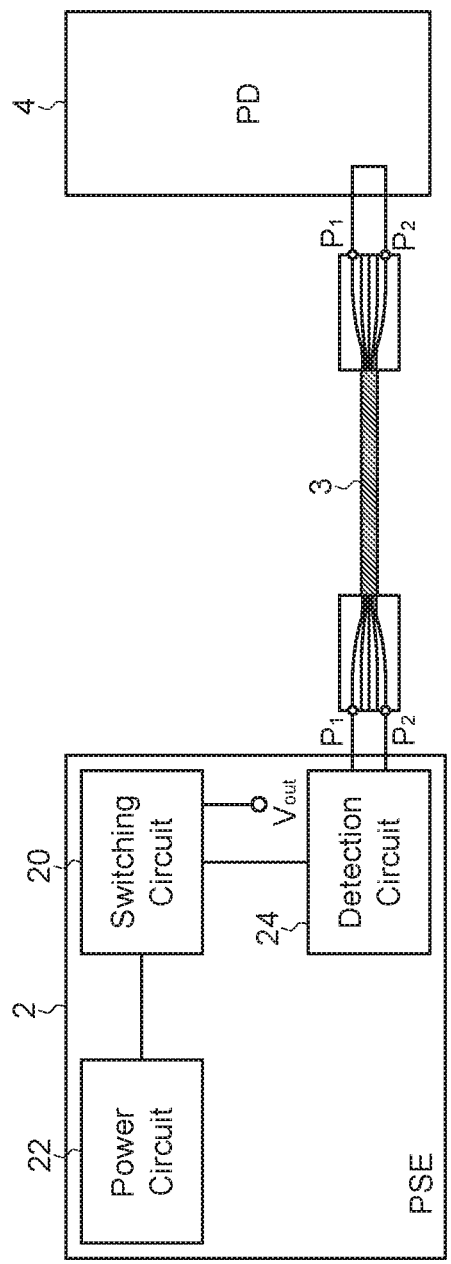
FIG. 3 shows a diagram of a power supply system according to one embodiment of the invention.

Please refer to FIG. 3 for the operation of the PSE 2. FIG. 3 shows a diagram of a power supply system according to one embodiment of the invention. The power supply system S1 includes the PSE 2 as described above, an Ethernet cable 3, and a PD 4. The PD 4 is connected to the PSE 2 via the Ethernet cable 3. The PD 4 makes the first pin $P_1$ of the Ethernet cable 3 connected to the second pin $P_2$ of the Ethernet cable 3. For example, in the PD 4, the first pin $P_1$ is directly connected to the second pin $P_2$ such that these two pins are effectively shorted or nearly shorted. The PSE 2 may be a wireless adapter, the PD 4 may be an IP camera, and the Ethernet cable 3 may be equipped with RJ45 connectors having eight pins.

The power circuit 22 may include a voltage transformer coupled to the AC supply mains to provide a DC voltage, such as DC 12V or 48V. The state of the switching circuit 20 is switched between an on state and an off state to control whether or not the power circuit 22 provides power to the power supply output terminal $V_{out}$. The power supply output terminal $V_{out}$ is for example the center tap of the transformer as shown in FIG. 1. Therefore the switching circuit 20 controls whether or not the PSE 2 supplies power to the PD 4 via the Ethernet cable 3. The state of the switching circuit 20 is controlled by the first resistance $R_v$ between the first pin $P_1$ and the second pin $P_2$ of the Ethernet cable 3. The first resistance $R_v$ is detected by the detection circuit 24.

When the first pin $P_1$ and the second pin $P_2$ are open circuited, for example, there is no powered device being connected, the first resistance $R_v$ is an extremely large value. The detection circuit 24 turns off the switching circuit 20. In other words, the switching circuit 20 is in the off state, and the PSE 2 does not supply power.

When there is another device different from the PD 4 connected to the Ethernet cable 3, the detection circuit 24 detects the first resistance $R_v$ between the first pin $P_1$ and the second pin $P_2$. The first resistance $R_v$ may be caused by an internal resistance of this connected device. When the first resistance $R_v$ is greater than or equal to a threshold resistance $R_{th}$, the connected device is determined to be an incompatible device. The switching circuit 20 is in the off state.

When the first resistance $R_v$ is less than the threshold resistance $R_{th}$, the detection circuit 24 turns on the switching circuit 20. The switching circuit 20 is in the on state, and thus the PSE 2 supplies power to the PD 4 via the Ethernet cable 3. One such example is shown in FIG. 3, the PD 4 makes the first pin P1 connected to the second pin P2. The first resistance $R_v$ detected by the detection circuit 24 may be very small (only the resistance on the Ethernet cable 3).

Refer to the PoE system shown in FIG. 1. Because pins 4, 5, 7, 8 of the Ethernet cable are not designated to any specific use, pins 4, 5, 7, 8 may be utilized to detect the first resistance $R_v$. The first pin $P_1$ may be pin 4 or pin 5 in a twisted pair. The second pin $P_2$ may be pin 7 or pin 8 in the other twisted pair.

The PSE 2 and the PD 4 may be designed to match each other. The PD 4 makes the first pin $P_1$ connected to the second pin $P_2$ such that the first resistance $R_v$ detected by the detection circuit 24 is less than a threshold resistance $R_{th}$, and then the PSE 2 is able to supply power to the PD 4. The threshold resistance $R_{th}$ may be 25Ω, 50Ω, or other suitable values, depending on the design requirements. On the other hand, when another device (such as a laptop computer) other than the PD 4 is connected, because the first pin $P_1$ and the second pin $P_2$ are not shorted in this connected device, the detection circuit 24 may detect the first resistance $R_v$ as 150Ω, which may be the resistance between pin 4 and pin 7 of this connected device. In such case the PSE 2 does not supply power to prevent possible damage to this device caused by the unexpected power supply.

In PSE 2, the detection circuit 24 detects a resistance and controls the state of the switching circuit 20 accordingly. There may be several possible implementations of the PSE 2. One exemplary circuit is given below. However, the invention is not limited to this circuit structure.

Figure 4:
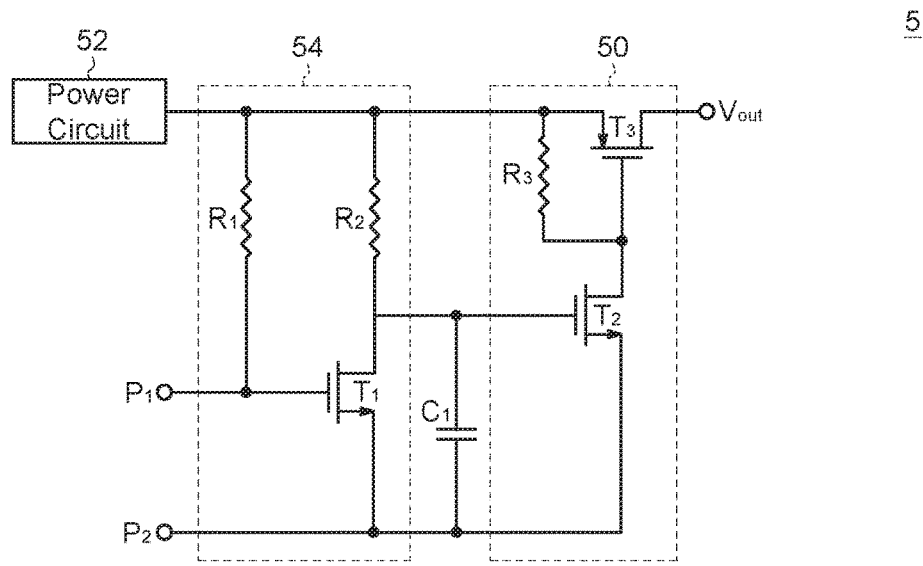
FIG. 4 shows a circuit diagram of an implementation of the power sourcing equipment according to one embodiment of the invention.

FIG. 4 shows a circuit diagram of an implementation of the power sourcing equipment according to one embodiment of the invention. The PSE 5 includes a switching circuit 50, a power circuit 52, and a detection circuit 54. The detection circuit 54 includes a transistor $T_1$ (such as NMOS), having a control terminal (such as gate), a first terminal (such as drain), and a second terminal (such as source). The control terminal is coupled to the first pin $P_1$ and coupled to the power circuit 52 via a resistor $R_1$. The first terminal is coupled to the power circuit 52 via a resistor $R_2$. The second terminal is coupled to the second pin $P_2$.

The switching circuit 50 includes a transistor $T_2$ (such as NMOS) and a transistor $T_3$ (such as PMOS). The transistor $T_2$ has a control terminal (such as gate) coupled to the first terminal of the transistor $T_1$, a first terminal (such as drain) coupled to the power circuit 52 via the resistor $R_3$, and a second terminal (such as source) coupled to the second terminal of the transistor $T_1$. The transistor $T_3$ has a control terminal (such as gate) coupled to the first terminal of the transistor $T_2$, a first terminal (such as drain) coupled to the voltage supply output terminal $V_{out}$, and a second terminal (such as source) coupled to the power circuit 52.

For ease of understanding, the output voltage of the power circuit 52 is defined as $V_{cc}$ (such as +12V), and the voltage level at the second pin $P_2$ is defined as the common ground. When the first pin $P_1$ and the second pin $P_2$ are open circuited, there is no current flowing through the resistor $R_1$, the voltage of the first pin $P_1$ is about $V_{cc}$. The transistor $T_1$ is on, and hence the voltage at the control terminal of the transistor $T_2$ is pulled down, and the transistor $T_2$ is off. The voltage at the control terminal of the transistor $T_3$ is about $V_{cc}$. The transistor $T_3$ is off, and the power circuit 52 does not supply power to the power supply output terminal $V_{out}$.

When there is a first resistance $R_v$=150Ω between the first pin $P_1$ and the second pin $P_2$, the voltage $V_{cc}$ output from the power circuit 52 is divided by a voltage divider formed by the resistor $R_1$ (such as 1 KΩ) and the first resistance $R_v$. The voltage at the first pin $P_1$ is still sufficiently high to turn on the transistor $T_1$ because of the ratio of the resistor $R_1$ to the first resistance $R_v$. As described above, the transistor $T_2$ is off and the transistor $T_3$ is off. The power circuit 52 does not supply power to the power supply output terminal $V_{out}$.

When the PD 4 makes the first pin $P_1$ connected to the second pin $P_2$ (the first resistance $R_v$~0Ω), the voltage at the first pin $P_1$ is close to ground level, and hence the transistor $T_1$ is off. The voltage at the control terminal of the transistor $T_2$ is pulled high to turn on the transistor $T_2$. Then the voltage at the control terminal of the transistor $T_3$ is pulled down to turn on the transistor $T_3$. The power circuit 52 outputs voltage to the power supply output terminal $V_{out}$, that is, the PSE 5 supplies power to the PD 4.

In this embodiment, the PSE 5 may further include a capacitor $C_1$. The capacitor $C_1$ prevents possible error, such as the transistor $T_3$ being turned on shortly, when this circuit initially boots up.

The PSE 5 described above is just exemplary rather than limiting. The transistors $T_1$-$T_3$ may be replaced by any switching elements, including BJT, MOSFET, CMOS, etc. The connection relationship between other passive elements, including capacitors and resistors, may also be adjusted according to the chosen switching elements and their polarities.

Figure 5:
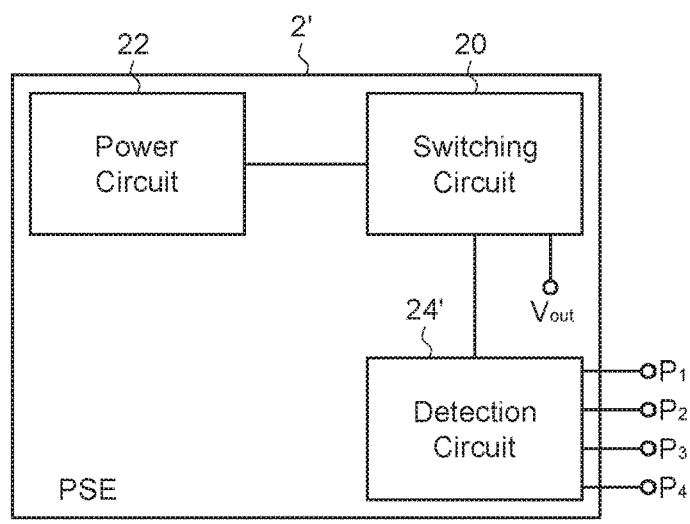
FIG. 5 shows a diagram of a power sourcing equipment according to one embodiment of the invention.

FIG. 5 shows a diagram of a power sourcing equipment according to one embodiment of the invention. As compared to the PSE 2 shown in FIG. 2, the detection circuit 24' further controls the state of the switching circuit 20 according to a second resistance $R_z$ between the third pin $P_3$ and the fourth pin $P_4$ of the Ethernet cable.

The control of the state of the switching circuit 20 may be for example: when the first resistance $R_v$ is not equal to the second resistance $R_z$ or when the difference between the first resistance $R_v$ and the second resistance $R_z$ is sufficiently large, the detection circuit 24' turns on the switching circuit 20. When the first resistance $R_v$ is equal to or sufficiently close to the second resistance $R_z$, the detection circuit 24' turns off the switching circuit 20.

When the first pin $P_1$ and the second pin $P_2$ are open circuited, and the third pin $P_3$ and the fourth pin $P_4$ are open circuited, in other words, there is no powered device connected to the PSE 2'. The first resistance $R_v$ and the second resistance $R_z$ are effectively both extremely large values. In this case the detection circuit 24' detects that the first resistance $R_v$ and the second resistance $R_z$ are equal. Thus the switching circuit 20 is off, the PSE 2' does not supply power. Similarly, when the first resistance $R_v$=150Ω between the first pin $P_1$ and the second pin $P_2$, and the second resistance $R_z$=150Ω between the third pin $P_3$ and the fourth pin $P_4$, the detection circuit 24 also turns the switching circuit 20 off.

When the first pin $P_1$ and the second pin $P_2$ are nearly short circuited, the first resistance $R_v$ is close to 0Ω. On the other hand, the second resistance $R_z$ between the third pin $P_3$ and the fourth pin $P_4$ is large, for example, R=1 KΩ. The detection circuit 24' detects that the first resistance $R_v$ is not equal to the second resistance $R_z$, and thus the switching circuit 20 is turned on. The PSE 2' supplies power via the Ethernet cable.

As shown in FIG. 1, pins 4, 5, 7, 8 of the Ethernet cable are not designated to specific use. In one embodiment, the first pin P1 may be pin 4 of the Ethernet cable. The second pin P2 may be pin 7 of the Ethernet cable. The third pin P3 may be pin 5 of the Ethernet cable. The fourth pin P4 may be pin 8 of the Ethernet cable. In other words, pins 1, 2, 3, 6 are used for transmitting data and power, while pins 4, 5, 7, 8 are used for detecting resistance to determine whether or not the connected device is a compatible powered device.

Figure 6:
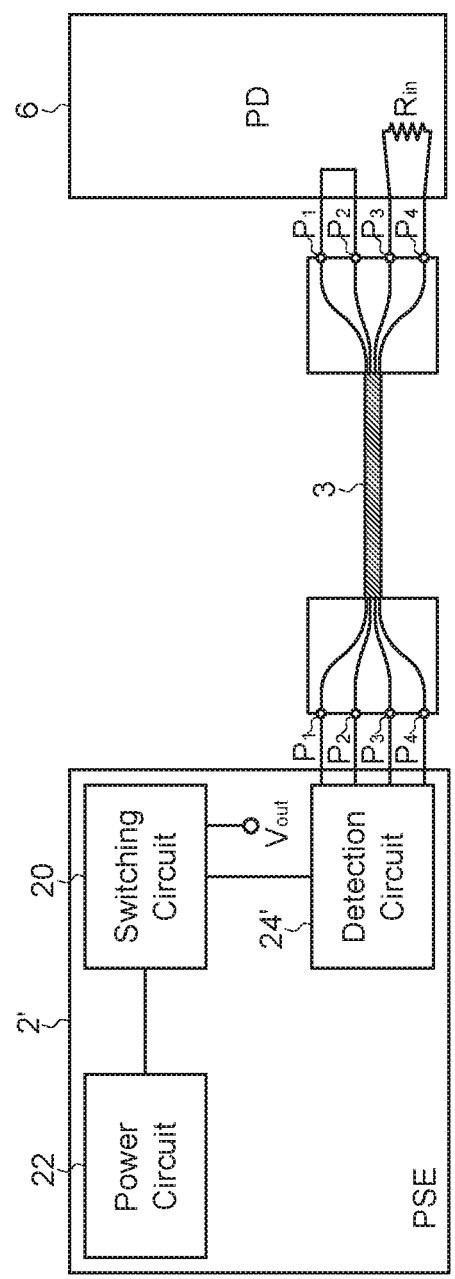
FIG. 6 shows a diagram of a power supply system according to one embodiment of the invention.

FIG. 6 shows a diagram of a power supply system according to one embodiment of the invention. The power supply system S2 includes a PSE 2', an Ethernet cable 3, and a PD 6. The PSE 2' and the PD 6 may be designed to match each other. The PD 6 makes the first pin $P_1$ connected to the second pin $P_2$ of the Ethernet cable 3. The PD 6 includes an internal resistor $R_{in}$. The internal resistor $R_{in}$ is disposed between the third pin $P_3$ and the fourth pin $P_4$ of the Ethernet cable 3. When the PD 6 is connected to the PSE 2' via the Ethernet cable 3, the detection circuit 24' detects that the first resistance $R_v(\sim 0\Omega)$ is not equal to the second resistance $R_z(\sim R_{in})$. Therefore the PSE 2' supplies power to the PD 6 via the Ethernet cable 3.

In PSE 2', the detection circuit 24' detects the first resistance $R_v$ and the second resistance $R_z$ to control the state of the switching circuit 20 in response to the detection result. There may be several possible implementations of the PSE 2'. One exemplary circuit is given below. However, the invention is not limited to this circuit structure.

Figure 7:
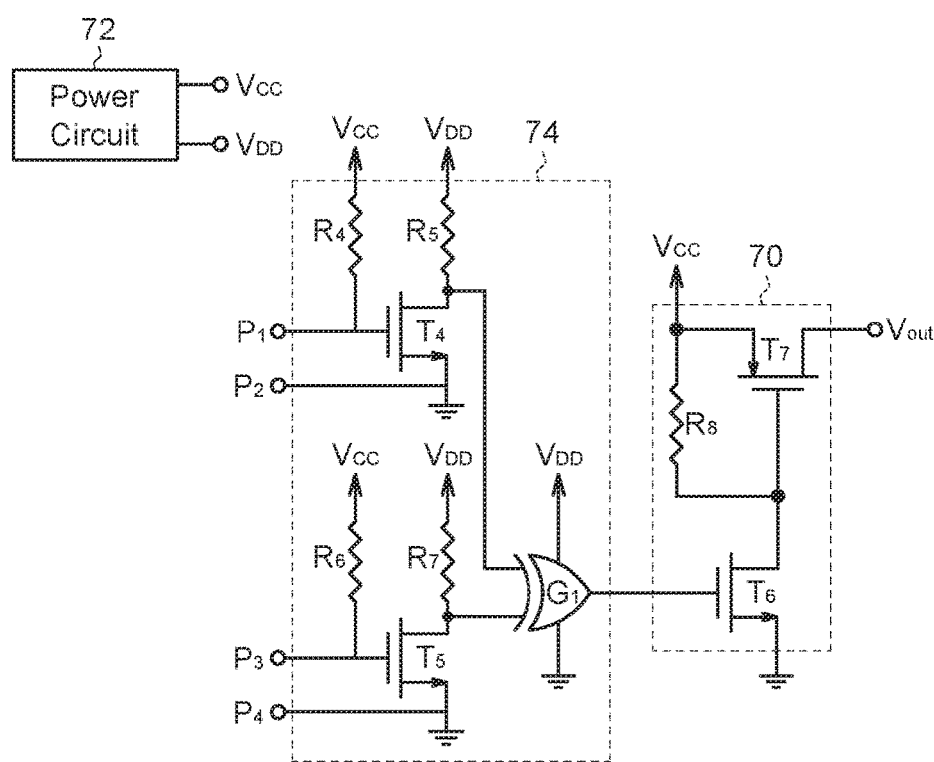
FIG. 7 shows a circuit diagram of an implementation of the power sourcing equipment according to one embodiment of the invention.

FIG. 7 shows a circuit diagram of an implementation of the power sourcing equipment according to one embodiment of the invention. The PSE 7 includes a switching circuit 70, a power circuit 72, and a detection circuit 74. The power circuit 72 is capable of providing two different voltage levels, including $V_{CC}$ (such as +12V) and $V_{DD}$ (such as +3.3V). The voltage level $V_{DD}$ may be the power supply for the digital logic circuits inside the PSE 7. The detection circuit 74 detects a first resistance $R_v$ between the first pin $P_1$ and the second pin $P_2$, and also detects a second resistance $R_z$ between the third pin $P_3$ and the fourth pin $P_4$. The detection circuit 74 includes an XOR gate $G_1$.

The first resistance $R_v$ between the first pin $P_1$ and the second pin $P_2$ affects the output state of the transistor $T_4$. The second resistance $R_z$ between the third pin $P_3$ and the fourth pin $P_4$ affects the output state of the transistor $T_5$. The operation of the transistors $T_4$ and $T_5$ may be referred to the embodiment related to the PSE 5 and FIG. 4, and thus is not repeated here. When the first resistance $R_v$ and the second resistance $R_z$ produces the same effect to the output of the transistors $T_4$ and $T_5$, the XOR gate $G_1$ outputs logic 0. Then the transistors $T_6$ and $T_7$ are off, and power is not supplied to the power supply output terminal $V_{out}$. On the other hand, when the first resistance $R_v$ and the second resistance $R_z$ produces different effect to the output of the transistors $T_4$ and $T_5$, the XOR gate $G_1$ outputs logic 1. Then the transistors $T_6$ and $T_7$ are on, and power is supplied to the power supply output terminal $V_{out}$.

The PSE 7 described above is just exemplary rather than limiting. The transistors $T_4$-$T_7$ may be replaced by any switching elements, including BJT, MOSFET, CMOS, etc. In addition, the number of the switching elements may also be increased or decreased according to the operating environment and the design criteria. The connection relationship between other passive elements may also be adjusted according to the chosen switching elements and their polarities.

The power sourcing equipment and the power supply system disclosed herein utilize an Ethernet cable to supply power. Therefore the location that the powered device may be installed becomes more flexible, without being restricted by the socket location. The PSE is able to determine whether or not the connected PD is a compatible device by detecting a resistance. When the detected resistance is within a predetermined range, or when multiple detected resistances satisfy a specific condition, power is supplied to the PD. As such, the PSE is capable of selectively supplying power to the PD according to the pairing relationship between the PSE and the PD. Power is supplied only when the PD is determined as a compatible device. Therefore possible damage can be avoided when other incompatible devices are connected via the Ethernet cable to the PSE. Furthermore, the PD may be successfully identified by the PSE by connecting two pins of the Ethernet cable or providing different resistance values.

In addition, a simple yet efficient circuit design is provided in the disclosure to detect resistance between the pins. Therefore no additional microprocessor is required to determine the compatibility of the PD. The circuit structure proposed herein does not occupy much hardware area and thus effectively deal with the pairing process between the PSE and the PD to save production cost.

Since pins 4, 5, 7, 8 of the Ethernet cable that are not designated to any specific use are utilized to detect resistance, the connection structure of the Ethernet is not affected. As shown in FIG. 1, data transmission and power supply may be accomplished by pins 1, 2, 3, 6. There is no need to modify the Ethernet connection architecture. Pins 4, 5, 7, 8 are used for the pairing mechanism between the PSE and the PD to achieve selective power supply.

Figure 8:
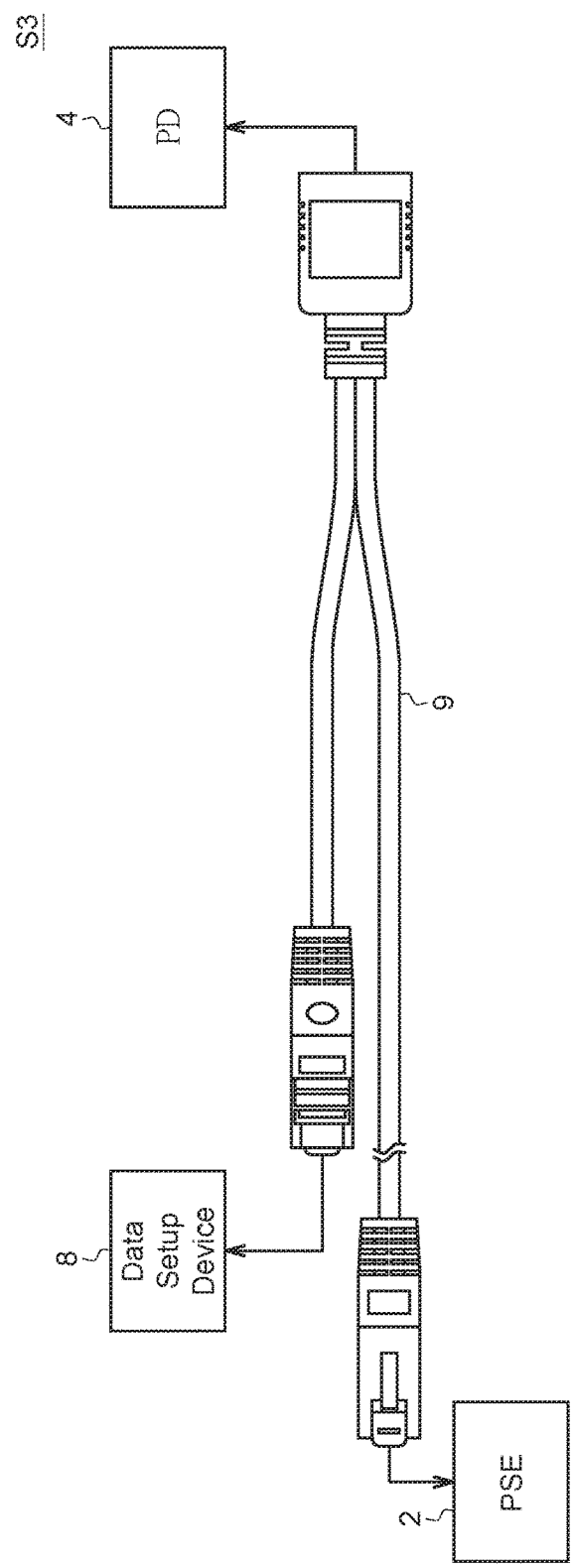
FIG. 8 shows a diagram illustrating a power supply system utilizing an Ethernet Y cable according to one embodiment of the invention.

FIG. 8 shows a diagram illustrating a power supply system utilizing an Ethernet Y cable according to one embodiment of the invention. In the power supply system S3, the PD 4 is connected to the PSE 2 and a data setup device 8 via the Ethernet Y cable 9. In such configuration, the PSE 2 supplies power to the PD 4, and the data setup device 8 is able to transmit data to the PD 4 via network connection. For example, the PD 4 is an IP camera, and the data setup device 8 is a personal computer. The IP camera is power supplied by the PSE 2 while being setup by the personal computer. The PD 4 (such as IP camera) is connected to the PSE 2 (such as wireless adapter) and the data setup device 8 (such as personal computer) simultaneously. Examples of the Ethernet Y cable 9 are described below.

Figure 9:
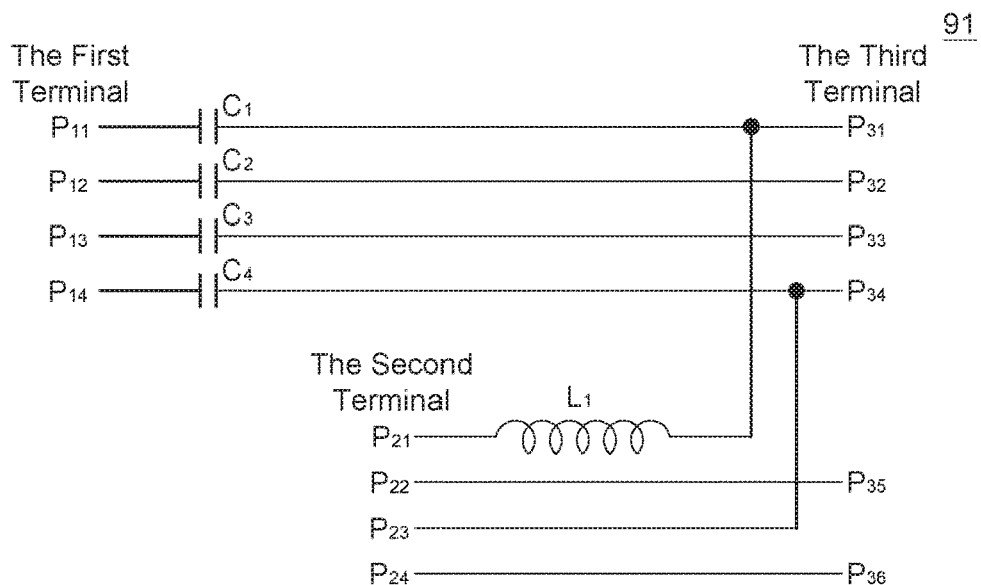
FIG. 9 shows a diagram of the Ethernet Y cable according to one embodiment of the invention.

FIG. 9 shows a diagram of the Ethernet Y cable 91 according to one embodiment of the invention. The Ethernet Y cable 91 has a first terminal, a second terminal, and a third terminal. As shown in FIG. 8, the first terminal may be connected to the data setup device 8, the second terminal may be connected to the PSE 2, and the third terminal may be connected to the PD 4. In one embodiment, the first terminal is a male interface, the second terminal is a male interface, and the third terminal is a female interface. As such, there may be another Ethernet cable disposed between the PD 4 and the third terminal of the Ethernet Y cable 91. The Ethernet Y cable 91 may be shortened in this way, hence facilitating ease of use and also reducing the production cost of the Ethernet cable 91.

The first terminal includes a first pin $P_{11}$, a second pin $P_{12}$, a third pin $P_{13}$, and a fourth pin $P_{14}$. The second terminal includes a first pin $P_{21}$, a second pin $P_{22}$, a third pin $P_{23}$, and a fourth pin $P_{24}$. The third terminal includes a first pin $P_{31}$, a second pin $P_{32}$, a third pin $P_{33}$, a fourth pin $P_{34}$, a fifth pin $P_{35}$, and a sixth pin $P_{36}$.

The Ethernet Y cable 91 includes a first capacitor $C_1$, a second capacitor $C_2$, a third capacitor $C_3$, a fourth capacitor $C_4$, and a first inductor $L_1$. The first capacitor $C_1$ connects the first pin of the first terminal $P_{11}$ to the first pin of the third terminal $P_{31}$. The second capacitor $C_2$ connects the second pin of the first terminal $P_{12}$ to the second pin of the third terminal $P_{32}$. The third capacitor $C_3$ connects the third pin of the first terminal $P_{13}$ to the third pin of the third terminal $P_{33}$. The fourth capacitor $C_4$ connects the fourth pin of the first terminal $P_{14}$ to the fourth pin of the third terminal $P_{34}$ and the third pin of the second terminal $P_{23}$. The first inductor $L_1$ connects the first pin of the second terminal $P_{21}$ to the first pin of the third terminal $P_{31}$. The second pin of the second terminal $P_{22}$ is connected to the fifth pin of the third terminal $P_{35}$, and the fourth pin of the second terminal $P_{24}$ is connected to the sixth pin of the third terminal $P_{36}$.

Data transmission is needed between the data setup device 8 and the PD 4. Pin 1 and pin 2 of the Ethernet cable are used to transmit data with differential signal (TX+, TX−), and pin 3 and pin 6 are used to receive data with differential signal (RX+, RX−). In one embodiment, the first to the fourth pins of the first terminal may be pins 1, 2, 3, 6 of the Ethernet cable respectively. The first to the fourth pins of the third terminal may also be pins 1, 2, 3, 6 of the Ethernet cable respectively.

As the power supply system S1 shown in FIG. 3, the PSE 2 detects the resistance between the first pin $P_1$ (pin 4 or pin 5 of the Ethernet cable) and the second pin $P_2$ (pin 7 or pin 8 of the Ethernet cable) to determine whether or not to supply power to the PD 4. Therefore in the embodiment shown in FIG. 9, the first pin of the second terminal $P_{21}$ may be pin 1 of the Ethernet cable, the second pin of the second terminal $P_{22}$ may be pin 4 or pin 5 of the Ethernet cable, the third pin of the second terminal $P_{23}$ may be pin 6 of the Ethernet cable, and the fourth pin of the second terminal $P_{24}$ may be pin 7 or pin 8 of the Ethernet cable. The fifth pin of the third terminal $P_{35}$ may be pin 4 or pin 5 of the Ethernet cable, and the sixth pin of the third terminal $P_{36}$ may be pin 7 or pin 8 of the Ethernet cable. As such, the PSE 2 connected to the second terminal is able to determine whether or not to supply power according to the resistance detected between the second pin $P_{22}$ and the fourth pin $P_{24}$. If the determination result is affirmative, power is supplied via the first pin $P_{21}$ and the third pin $P_{23}$ to the PD 4 connected to the third terminal.

In the above embodiment, the PSE 2 at the second terminal supplies power via pin 1 and pin 6 of the Ethernet cable to the PD 4 at the third terminal. However, the connection method is not limited thereto. Power may also be supplied to the PD 4 via any following combination of pins of the Ethernet cable: pin 1 and pin 3, pin 2 and pin 3, pin 2 and pin 6. For example, when the PSE 2 supplies power via pin 2 and pin 3, the first pin of the second terminal $P_{21}$ is pin 2 of the Ethernet cable, and the third pin of the second terminal $P_{23}$ is pin 3 of the Ethernet cable. The mapping of the other pins at the first terminal and the third terminal may be adjusted correspondingly. For example, the first to the fourth pins of the first and third terminals may be pins 2, 1, 6, 3 of the Ethernet cable respectively.

The first to the fourth capacitors $C_1$-$C_4$ are disposed on the connection paths between the first terminal and the third terminal, such that DC signal may be isolated, and AC signal in a particular frequency band may pass through. The capacitors $C_1$-$C_4$ may be regarded as AC coupling and DC blocking capacitors. For example, the PSE 2 provides a DC voltage 12V as the supply power for the PD 4. The data setup device 8 is not affected by the DC voltage 12V because of the blocking effect of the first to the fourth capacitors $C_1$-$C_4$, preventing possible damage to the data setup device 8 caused by excess current. Additionally, data setup device 8 is able to transmit AC signal related to setup data to the PD 4 through the first to the fourth capacitors $C_1$-$C_4$.

The first inductor L1 is disposed on the connection path between the second terminal and the third terminal, such that DC signal may pass through and AC signal may be isolated. Therefore the PSE 2 is able to supply DC power to the PD 4. As for the AC signal related to setup data, because the second terminal is effectively isolated, the PSE 2 does not affect the data transmission between the data setup device 8 and the PD 4.

The capacitance of the first to the fourth capacitors $C_1$-$C_4$ and the inductance of the first inductor $L_1$ depend on the frequency of the control and data signal transmitted on the Ethernet cable in order to generate the desired frequency response. In one embodiment, the capacitance of the first to the fourth capacitors $C_1$-$C_4$ ranges from 0.1 μF-0.2 μF, and the inductance of the first inductor $L_1$ ranges from 4 μH-8 μH.

The Ethernet Y cable in this embodiment connects the PSE, the PD, and the data setup device simultaneously. The PSE may supply power to the PD via the Ethernet Y cable, and the data setup device may perform setup procedure on the PD also via the Ethernet Y cable. Furthermore, because appropriate capacitors and inductors are disposed in the Ethernet Y cable, signals are blocked or allowed to pass based on the signal frequency. Consequently, the power supply signal does not interfere with the transmitted data signal.

By utilizing the Ethernet Y cable 91 in this embodiment, the PSE is able to detect the resistance to determine whether or not the PD is a compatible device. Power is supplied to the PD only when the detected resistance is in a particular range. This pairing mechanism achieves selective power supply to prevent possible damage to the PD caused by unexpected power supply.

Another Ethernet Y cable 92 is provided in this disclosure. The Ethernet Y cable 92 may be used in the circumstance where the PSE 2 does not need to detect the PD 4, for example, when used by a user who is familiar with the operation or by a skilled technician. Other examples include a fixed particular usage mode, such as being used in the installation stage of an IP camera. Under these circumstances the PSE 2 supplies power to the PD 4 without detecting the resistance in the PD 4. The circuit as well as the pin count is therefore simplified in the Ethernet Y cable 92.

Figure 10:
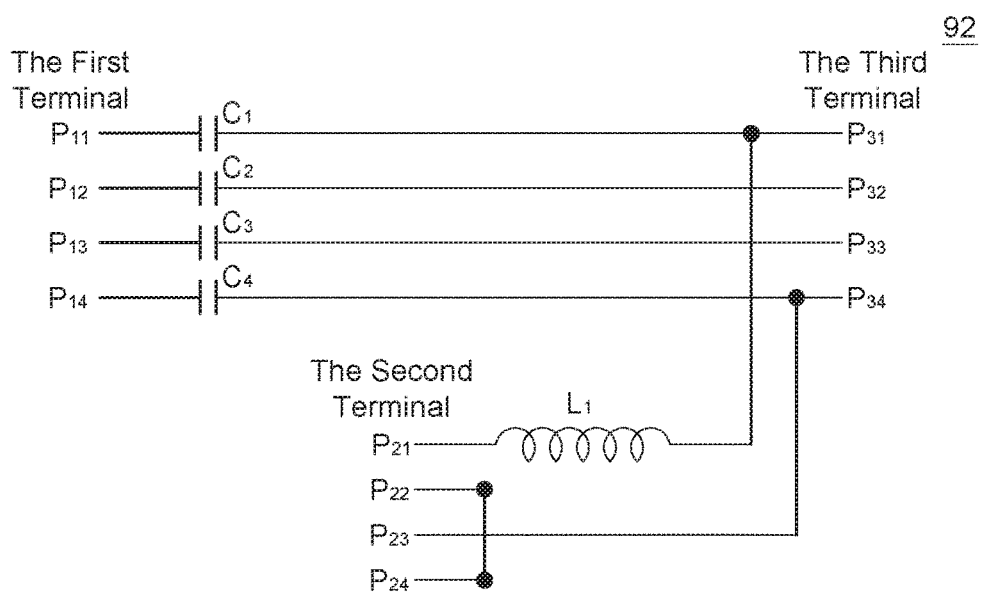
FIG. 10 shows a diagram of the Ethernet Y cable according to one embodiment of the invention.

FIG. 10 shows a diagram of the Ethernet Y cable 92 according to one embodiment of the invention. The second pin of the second terminal $P_{22}$ is connected to the fourth pin of the second terminal $P_{24}$. The second pin $P_{22}$ and the fourth pin $P_{24}$ of the second terminal are not connected to the third terminal. When the second terminal of the Ethernet cable 92 is connected to the PSE 2, the resistance detected by the PSE 2 would be very small. The PSE 2 then determines to supply power to the PD 4. Power is supplied via the first pin $P_{21}$ and the third pin $P_{23}$ of the second terminal to the PD 4 connected to the third terminal.

As compared to the Ethernet Y cable 91 shown in FIG. 9, the hardware wiring used by the Ethernet Y cable 92 is reduced, also the pin count of the third terminal is reduced. The circuit design of the Ethernet Y cable 92 is simplified to reduce the production cost.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A power sourcing equipment to be connected to an Ethernet cable, the power sourcing equipment comprising:
   a switching circuit;
   a power circuit, coupled to a power supply output terminal via the switching circuit; and
   a detection circuit, configured to control a state of the switching circuit according to a first resistance between a first pin and a second pin of the Ethernet cable.

2. The power sourcing equipment according to claim 1, wherein the detection circuit is configured to turn on the switching circuit when the first resistance is less than a threshold resistance.

3. The power sourcing equipment according to claim 1, wherein the detection circuit is configured to turn off the switching circuit when the first resistance is greater than or equal to a threshold resistance.

4. The power sourcing equipment according to claim 1, wherein the first pin is pin 4 or pin 5 of the Ethernet cable, and the second pin is pin 7 or pin 8 of the Ethernet cable.

5. The power sourcing equipment according to claim 1, wherein the detection circuit is configured to control the state of the switching circuit according to a second resistance between a third pin and a fourth pin of the Ethernet cable.

6. The power sourcing equipment according to claim 5, wherein the detection circuit is configured to turn on the switching circuit when the first resistance is not equal to the second resistance.

7. The power sourcing equipment according to claim 5, wherein the first pin is pin 4 of the Ethernet cable, the second pin is pin 7 of the Ethernet cable, the third pin is pin 5 of the Ethernet cable, and the fourth pin is pin 8 of the Ethernet cable.

8. A power supply system, comprising:
   an Ethernet cable;
   a power sourcing equipment, comprising;
   a switching circuit;
   a power circuit, coupled to a power supply output terminal via the switching circuit; and
   a detection circuit, configured to control a state of the switching circuit according to a first resistance between a first pin and a second pin of the Ethernet cable; and
   a powered device, connected to the power sourcing equipment via the Ethernet cable, wherein the powered device makes the first pin of the Ethernet cable connected to the second pin of the Ethernet cable.

9. The power supply system according to claim 8, wherein the first pin is pin 4 or pin 5 of the Ethernet cable, and the second pin is pin 7 or pin 8 of the Ethernet cable.

10. A power supply system, comprising:
    an Ethernet cable;
    a power sourcing equipment, comprising;
    a switching circuit;
    a power circuit, coupled to a power supply output terminal via the switching circuit; and
    a detection circuit, configured to control a state of the switching circuit according to a first resistance between a first pin and a second pin of the Ethernet cable and a second resistance between a third pin and a fourth pin of the Ethernet cable; and
    a powered device, connected to the power sourcing equipment via the Ethernet cable, wherein the powered device makes the first pin of the Ethernet cable connected to the second pin of the Ethernet cable, and the powered device comprises an internal resistor, which is disposed between the third pin and the fourth pin of the Ethernet cable.

11. The power supply system according to claim 10, wherein the first pin is pin 4 of the Ethernet cable, the second pin is pin 7 of the Ethernet cable, the third pin is pin 5 of the Ethernet cable, and the fourth pin is pin 8 of the Ethernet cable.

* * * * *